United States Patent [19]
Cheng

[11] Patent Number: 5,911,404
[45] Date of Patent: Jun. 15, 1999

[54] AUTOMATIC FLUID STOPPER AND FLUID STOPPER MOUNTING SPANNER

[76] Inventor: Tsan-Hsiung Cheng, No. 1051, Lung Tien, Lung Pen Tsun, Kuan Tien Hsiang, Tainan County, Taiwan

[21] Appl. No.: 09/045,908

[22] Filed: Mar. 23, 1998

[51] Int. Cl.[6] .................................................. F16L 29/02
[52] U.S. Cl. ..................................... 251/149.6; 137/329.2
[58] Field of Search ............................... 251/149.6, 155; 137/329.2, 329.1

[56] References Cited

U.S. PATENT DOCUMENTS

| | | | |
|---|---|---|---|
| 4,558,819 | 12/1985 | McDonald | 137/329.2 X |
| 5,110,088 | 5/1992 | Shih | 137/329.2 X |
| 5,344,119 | 9/1994 | Wang | 137/329.2 X |
| 5,628,340 | 5/1997 | Huang | 137/329.2 |
| 5,628,492 | 5/1997 | Lee | 137/329.2 X |

*Primary Examiner*—Kevin Lee
*Attorney, Agent, or Firm*—Dougherty & Troxell

[57] ABSTRACT

An automatic fluid stopper and fluid stopper mounting spanner including an automatic fluid stopper installed in a fluid outlet pipe and forced by fluid pressure to close the fluid outlet pipe, and a spanner for turning the automatic fluid stopper into or out of the fluid outlet pipe, wherein the automatic fluid stopper includes a threaded annular mounting base threaded into an inner thread on the fluid outlet pipe, a movable valve inserted through the mounting base and forced by fluid pressure to close the fluid passage, an O-ring mounted around the movable valve for sealing the gap between the outside wall of the movable valve and the inside wall of the mounting base, a stop block coupled to the movable valve, and a spring member mounted around the movable valve and retained between the mounting base and the stop block, the stop block being forced backwards to open the movable valve from the fluid passage through the mounting base when a fluid tap is fastened to the fluid outlet pipe, the movable valve being forced forwards by fluid pressure and the spring force of the spring member to close the fluid passage when the fluid tap is removed from the fluid outlet pipe.

7 Claims, 7 Drawing Sheets

FIG. 9

AUTOMATIC FLUID STOPPER AND FLUID STOPPER MOUNTING SPANNER

BACKGROUND OF THE INVENTION

The present invention relates to an automatic fluid stopper for use in a fluid outlet pipe to automatically close the fluid passage before the installation of a fluid tap in the fluid outlet pipe, or to automatically open the fluid passage after the installation of the fluid tap in the fluid outlet pipe.

A regular fluid tap uses a spindle with a valve stem and a stem washer (rubber gasket) for controlling the fluid passage. However, the stem washer (rubber gasket) wears quickly with use, more particularly when the fluid tap is used in a hot/cold fluid supply pipe system. When the stem washer (rubber gasket) of a fluid tap is damaged, the fluid, tap must be removed from the fluid outlet pipe for a repair work. When repairing a fluid tap, the fluid source (fluid tower) should be closed before removing the fluid tap from the fluid supply pipe. However, much time may be wasted in finding the correct switch from a set of switches on the fluid source (fluid tower) for example an apartment when closing the fluid source (fluid tower). Therefore, people tend to directly remove the fluid tap from the fluid outlet pipe for a repair work without closing the fluid source (fluid tower). However, if the fluid source (fluid tower) is not closed when the fluid tap is removed from the fluid outlet pipe, fluid immediately rushes out of the fluid outlet pipe, and the operator may be splashed with fluid before stopping the fluid outlet pipe with stopper means. Further, when replacing the connector, fluid outlet valve or connecting pipe at the fluid outlet pipe of a chemical storage tank or hot fluid supply source, chemical fluid or hot fluid must be drawn away before starting the repair work. If chemical fluid or hot fluid is not drawn away from the fluid outlet pipe before the repair work, residual chemical fluid or hot fluid will flow out of the fluid outlet pipe to injure the worker or to pollute the environment.

SUMMARY OF THE INVENTION

The present invention has been accomplished under the circumstances in view. It is one object of the present invention to provide an automatic fluid stopper for use in a fluid outlet pipe which automatically close the fluid outlet pipe when the fluid tap is removed from the fluid outlet pipe for a repair work. It is another object of the present invention to provide an automatic fluid stopper which is practical for use in an industrial piping system to automatically close the fluid passage and to stop hot fluid or steam from escaping out of the fluid outlet pipe when the fluid outlet valve or connecting pipe is disconnected from the fluid outlet pipe during a repair work. It is still another object of the present invention to provide an automatic fluid stopper which has a simple structure, and is easy to install. An automatic fluid stopper according to one embodiment of the invention comprises a threaded annular mounting base threaded into an inner thread on the fluid outlet pipe, a movable valve inserted the mounting base and forced by fluid pressure to close the fluid passage, an O-ring mounted around the movable valve for sealing the gap between the outside wall of the movable valve and the inside wall of the mounting base, a stop block coupled to the movable valve, and a spring member mounted around the movable valve and retained between the mounting base and the stop block. The stop block is forced backwards to move the movable valve away from the mounting base and to open the fluid passage when a fluid tap is fastened to the fluid outlet pipe. The movable valve is forced forwards by fluid pressure and the spring force of the spring member to move the O-ring into engagement with a tapered inside wall portion at the rear side of the mounting base and to close the fluid passage when the fluid tap is removed from the fluid outlet pipe.

DETAILED DESCRIPTION OF THE PREFERRED EMBODIMENT

Figure 1:
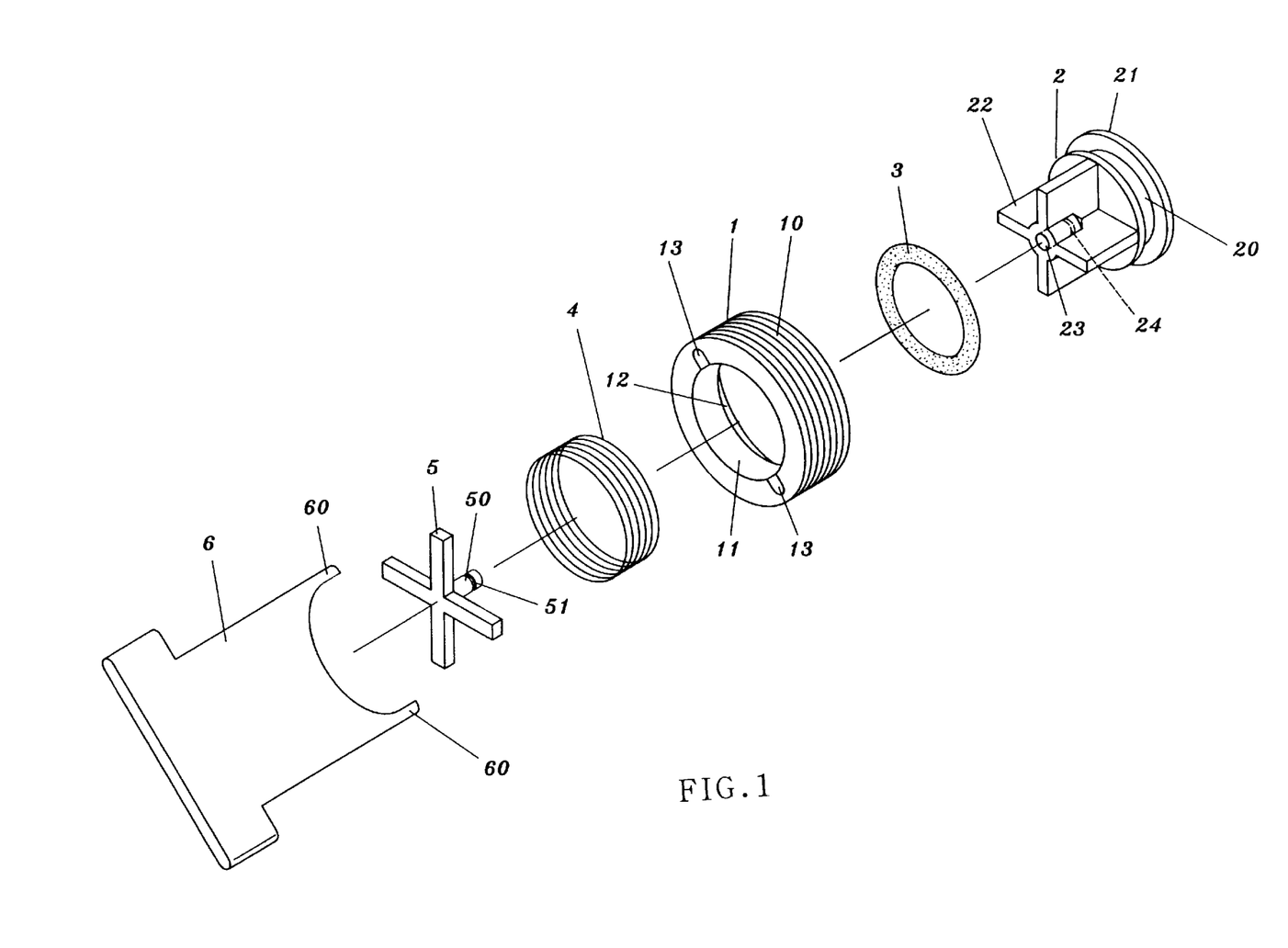
FIG. 1 is an exploded view of the present invention.

Referring to FIG. 1, the present invention comprises an automatic fluid stopper which is comprised of mounting base 1, a movable valve 2, an O-ring 3, a spring member 4 and a stop block 5, and a spanner 6 for turning the automatic fluid stopper in a fluid outlet pipe.

The mounting base 1 comprises an outer thread 10 around the peripheral for threading into an inner thread in a fluid outlet pipe, a fluid outlet 11 at the center, a tapered inside wall portion 12 at one side namely the rear side of the fluid outlet 11, the tapered inside wall portion 12 having a diameter gradually increasing toward the outside, and two opposite tool notches 13 at one side namely the front side of the fluid output outlet 11. The movable valve 2 is inserted through the fluid outlet 11, comprising an annular groove 20 around the periphery near a rear side thereof, a base 21 at the rear side, a crossed rib 22 at a front side thereof, a front center hole 23 axially disposed at the center of the crossed rib 22, and an annular flange 24 inside the front center hole 23. The diameter of the base 21 is relatively greater than the diameter of the fluid outlet 11. The O-ring 3 is mounted in the annular groove 20 around the movable valve 2. The spring member 4 is mounted around the crossed rib 22 of the movable valve 2. The stop block 5 is coupled to the crossed rib 22 of the movable valve 2 and supported on the spring member 4 in front of the mounting base 1. The stop block 5 is a crossed member having a mounting rod 50 perpendicularly extended from the back side and inserted into the front center hole 23 on the crossed rib 22 of the movable valve 2. The mounting rod 50 has an annular groove 51 for engagement with the annular flange 24 in the front center hole 23 on the crossed rib 22. The spanner 6 is used for turning the mounting base 1 into engagement with the inner thread in the fluid outlet pipe, having two plug tips 60 bilaterally raised from its front side.

Figure 2:
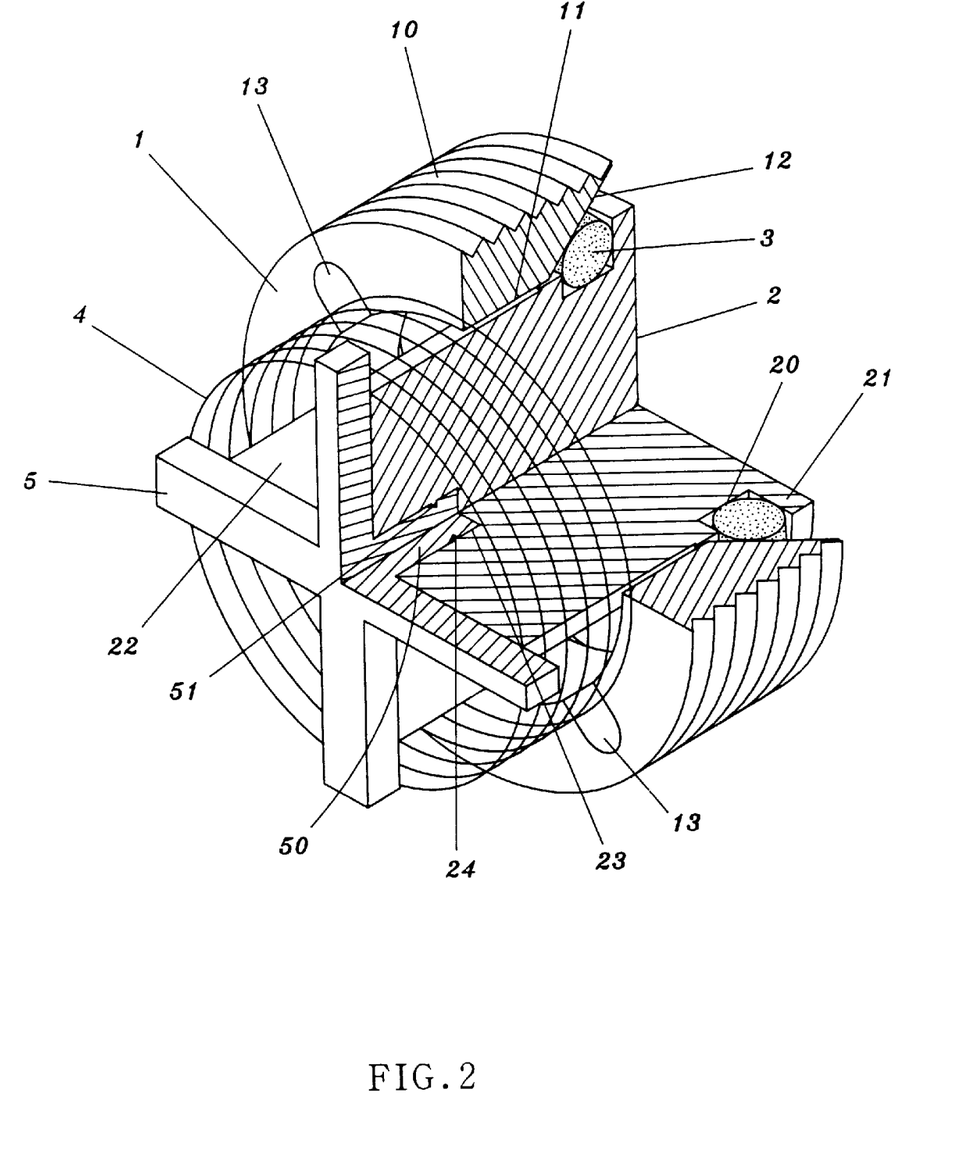
FIG. 2 is a cutaway view in an enlarged scale of the assembly of the automatic fluid stopper shown in FIG. 1.

The assembly process of the automatic fluid stopper is outlined hereinafter with reference to FIG. 2. The O-ring 3 is mounted in the annular groove 20 around the movable valve 2, then the movable valve 2 is inserted through the fluid outlet 11 on the mounting base 1, and then the spring member 4 is mounted around the crossed rib 22 of the movable base 2 and stopped in front of the mounting base 1, and then the stop block 5 is fastened to the movable valve 2 and supported on the spring member 4 in front of the mounting base 1 by inserting the mounting rod 50 of the stop block 5 into the front center hole 23 on the crossed rib 22 of the movable valve 2 to force the annular groove 51 on the mounting rod 50 into engagement with the annular flange 24 in the front center hole 23.

Figure 3:
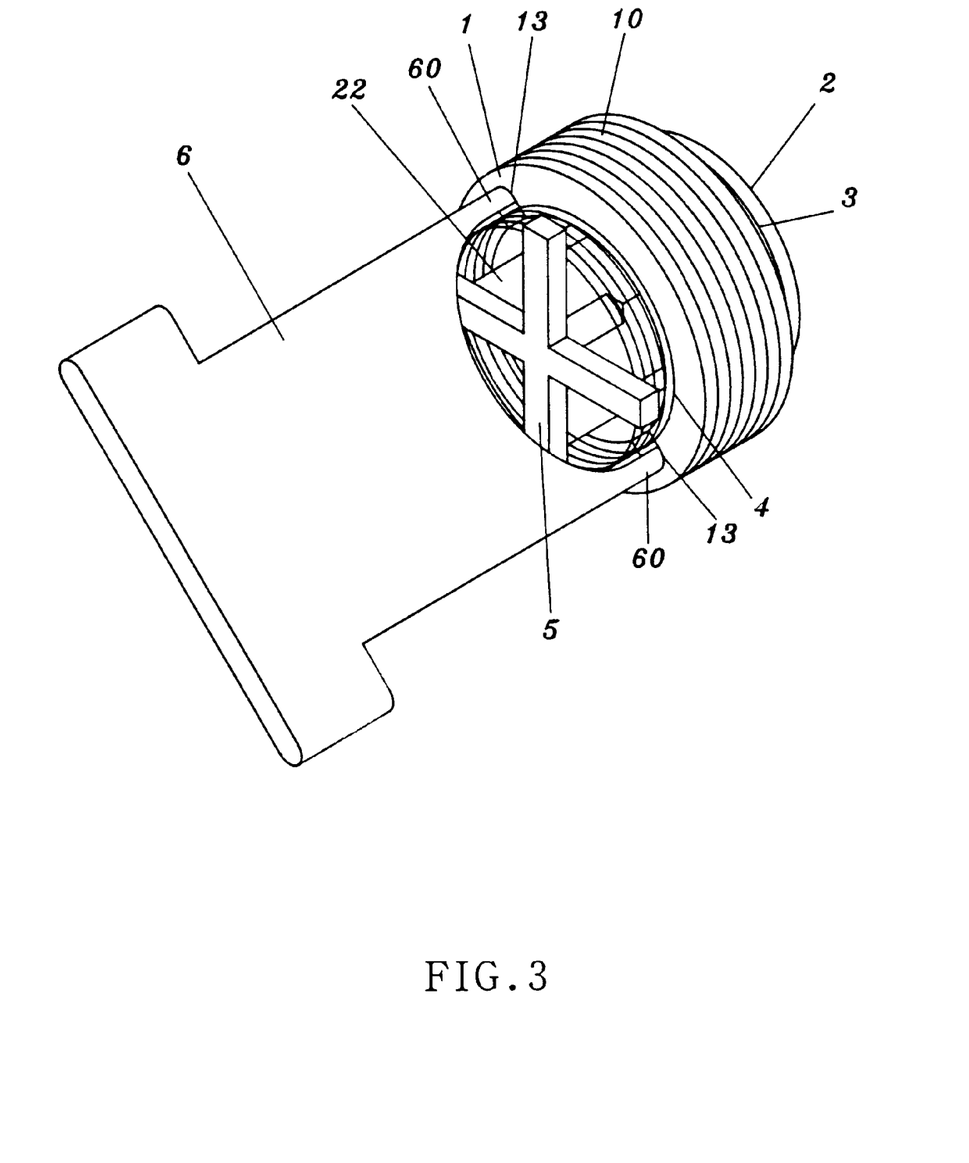
FIG. 3 is a perspective view of the present invention, showing the plug tips of the spanner engaged into the tool notches on the mounting base of the automatic fluid stopper.
Figure 4:
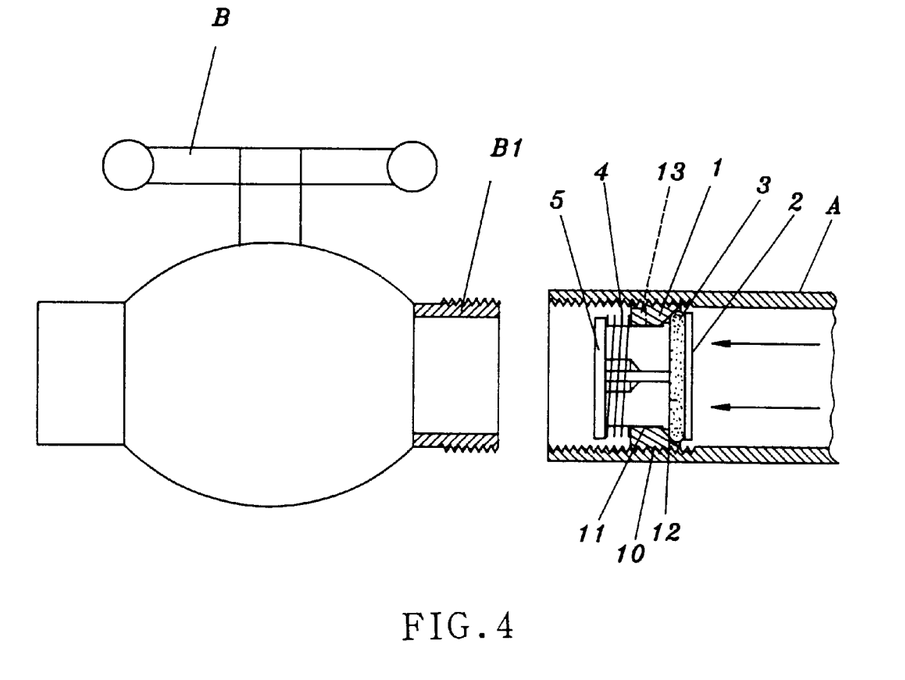
FIG. 4 is an applied view of the present invention, showing the automatic fluid stopper installed in the fluid outlet pipe and the fluid passage closed before the installation of the fluid tap in the fluid outlet pipe.
Figure 5:
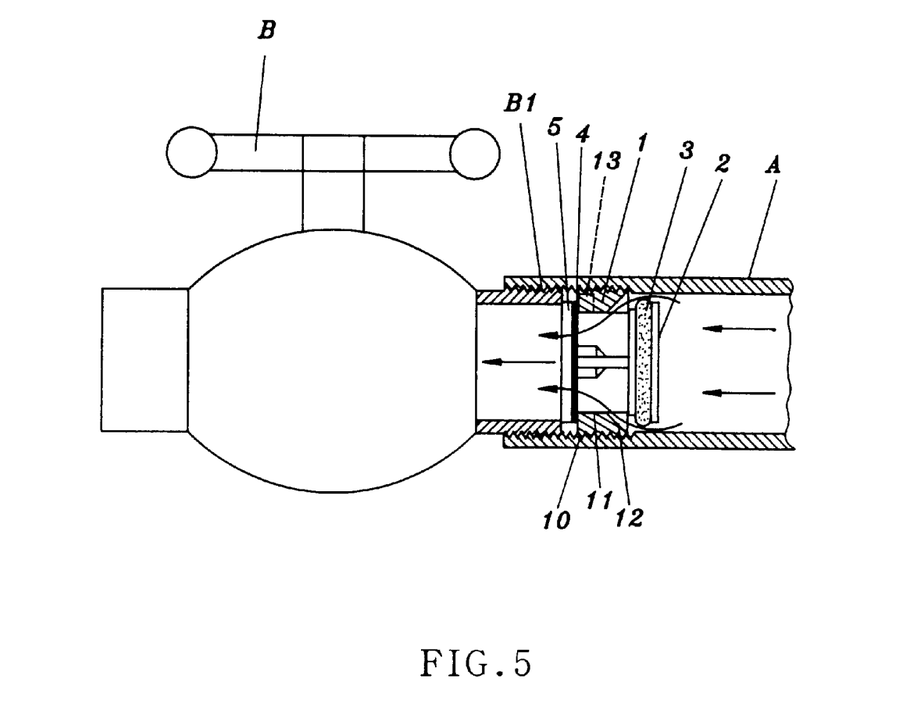
FIG. 5 is another applied view of the present invention, showing the fluid tap fastened to the fluid outlet pipe, the movable valve pushed backwards, the fluid passage opened.

Referring to FIGS. 3, 4 and 5, by inserting the plug tips 60 of the spanner 6 into the tool notches 13 on the mounting base 1, the automatic fluid stopper can then be turned with the spanner 6 and threaded into the inner thread in the fluid outlet pipe A (see FIGS. 3 and 4). Before the installation of a fluid tap B (or a pipe connector, connecting pipe, fluid outlet valve, etc.) in the fluid outlet pipe A, the movable valve 2 is forced forwards by fluid in the fluid outlet pipe A, causing the O-ring 3 to be moved with the movable valve 2 into engagement with the tapered inside wall portion 12 of the mounting base 1 to close the passage of the fluid outlet 11, and therefore the fluid outlet pipe A is closed. When the threaded mounting end B1 of the fluid tap B is threaded into the inner thread in the fluid outlet pipe A, the stop block 5 is forced inwards to compress the spring member 4 and to move the movable valve 2 backwards, thereby causing the O-ring 3 to be moved away from the tapered inside wall portion 12 of the mounting base 1, and therefore the passage of the fluid outlet 11 is opened for letting fluid to pass from the fluid outlet pipe A to the fluid tap B (see FIG. 5). If the fluid tap B is removed from the fluid outlet pipe A, the pressure of fluid in the fluid outlet pipe A immediately pushes the movable valve 2 forwards to force the O-ring 3 into engagement with the tapered inside wall portion 12 of the mounting base 1 and to stop the passage of the fluid outlet 11 of the mounting base 1, and therefore the fluid outlet pipe A is automatically closed. Therefore, the fluid outlet pipe A is automatically closed when the fluid tap B is removed from the fluid outlet pipe A for a repair work or replacing the rubber gasket. This design of automatic fluid stopper is practical for use in an industrial big scale fluid outlet valve or the fluid outlet pipe of a hot fluid delivery pipe or a chemical storage tank.

Figure 6:
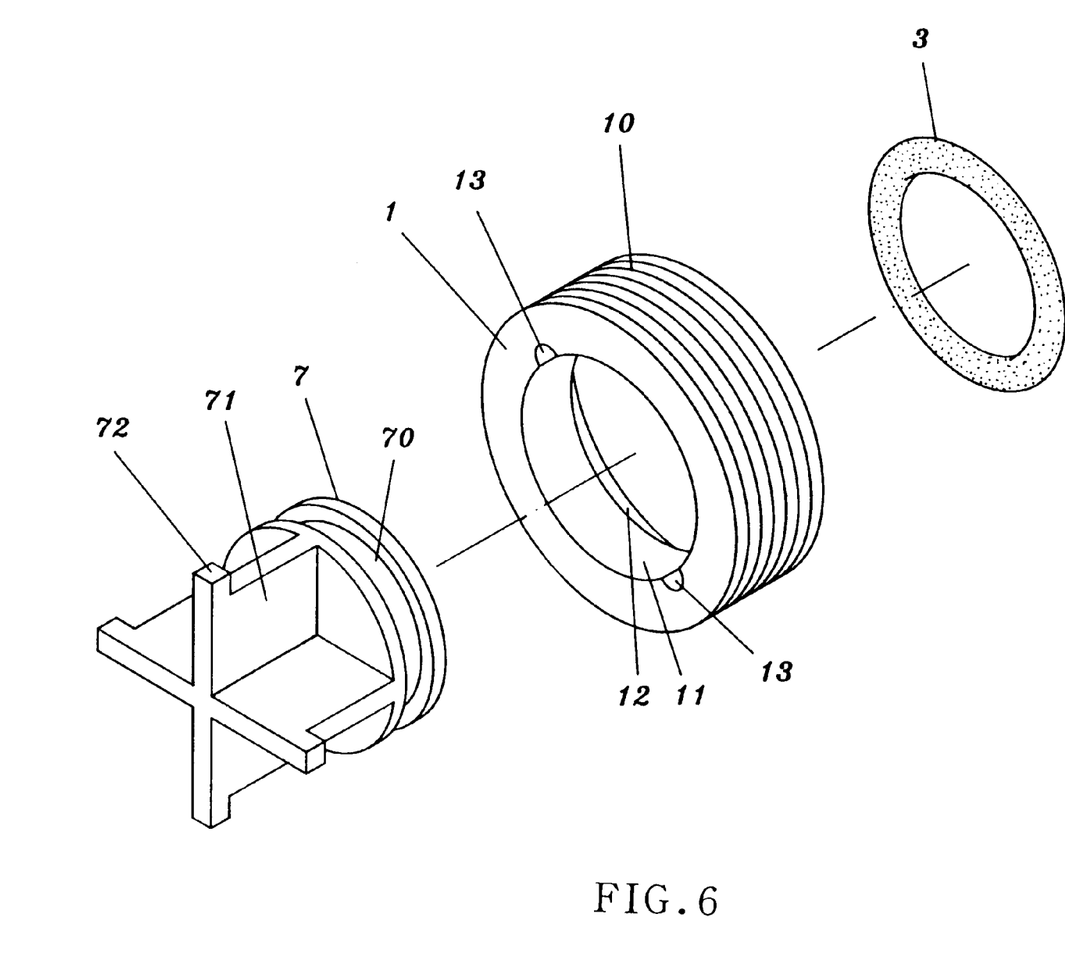
FIG. 6 is an exploded view of an alternate form of the automatic fluid stopper according to the present invention.
Figure 7:
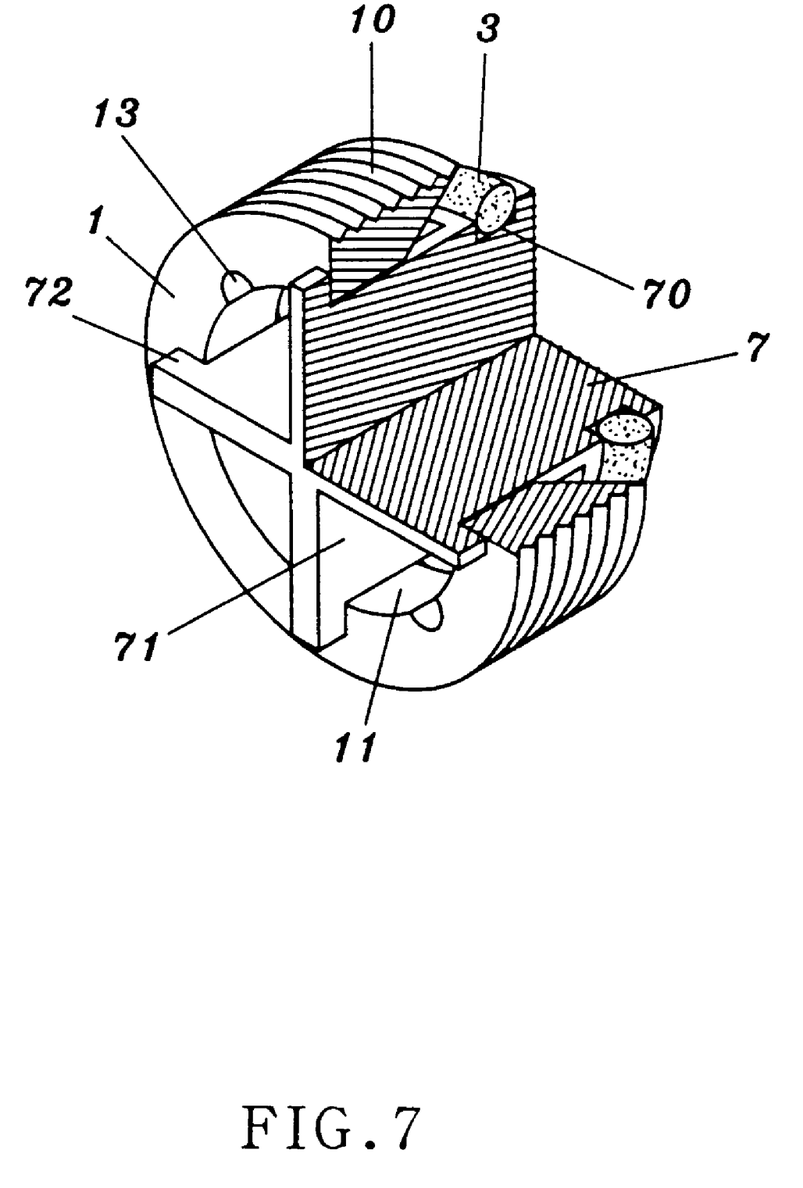
FIG. 7 is a cutaway view of the assembly of the automatic fluid stopper shown in FIG. 6.
Figure 8:
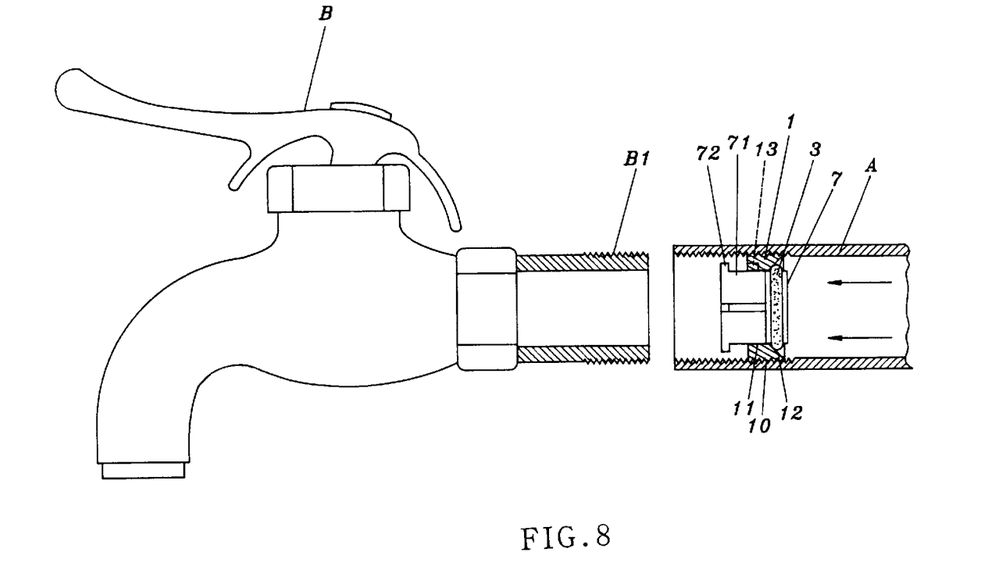
FIG. 8 is a sectional view showing the automatic fluid stopper of FIG. 6 installed in the fluid outlet pipe and the fluid passage closed before the installation of the fluid tap in the fluid outlet pipe according to the present invention.
Figure 9:
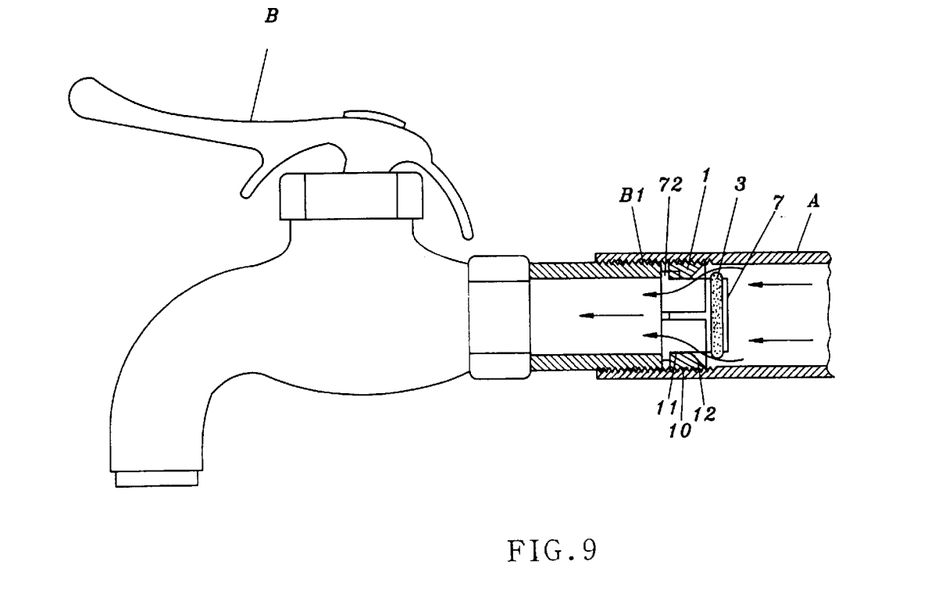
FIG. 9 is similar to FIG. 8 but showing the fluid tap fastened to the fluid outlet pipe, the movable valve pushed backwards, the fluid passage opened.

FIGS. 6 and 7 show an alternate form of the automatic fluid stopper according to the present invention. According to this alternate form, the automatic fluid stopper is comprised of a movable valve 7, an O-ring 3, and a mounting base 1 (see FIG. 6). The mounting base 1 and the O-ring 3 are same as that shown in FIG. 1. The movable valve 7 comprises an annular groove 70 around the periphery near its rear side, a crossed rib 71 at its front side, and a plurality of stop rods 72 integral with the crossed rib 71. When the movable valve 7 is inserted through the fluid outlet 11 on the mounting base 1, the stop rods 72 of the movable valve 7 are stopped at the front side of the mounting base 1 (see FIG. 7). By means of the aforesaid spanner 6, the automatic fluid stopper can be conveniently installed in a home fluid outlet pipe A (see FIG. 8). Before the installation of a fluid tap B in the home fluid outlet pipe A, the movable valve 7 is pushed forwards by the pressure of fluid in the home fluid outlet pipe A to force the O-ring 3 into engagement with the tapered inside wall portion 12 of the mounting base 1 and to close the home fluid outlet pipe A. When the threaded mounting end B1 of the fluid tap B is threaded into the inner thread in the home fluid outlet pipe A, the movable valve 7 is pushed backwards to move the O-ring 3 away from the tapered inside wall portion 12 of the mounting base 1 and to open the home fluid outlet pipe A, enabling fluid to flow out of the home fluid outlet pipe A into the fluid tap B (see FIG. 9). If the fluid tap B is removed from the fluid outlet pipe A for a repair work, the pressure of fluid in the fluid outlet pipe A immediately pushes the movable valve 7 forwards to force the O-ring 3 into engagement with the tapered inside wall portion 13 of the mounting base 1, and therefore the fluid outlet pipe A is automatically closed.

It is to be understood that the drawings are designed for purposes of illustration only, and are not intended as a definition of the limits and scope of the invention disclosed.

What the invention claimed is:

1. An automatic fluid stopper comprising;
a mounting base having an outer thread around a periphery for threading into an inner thread of a fluid outlet pipe, the mounting base having a fluid outlet at a center, a tapered inside wall portion at a rear side of said fluid outlet, and two opposite tool notches bilaterally disposed adjacent to a front side of said fluid outlet; a movable valve inserted through the fluid outlet on said mounting base located so as to be forced by fluid pressure in said fluid outlet pipe against said mounting base to close said fluid outlet, said movable valve having an annular groove around a periphery adjacent to a rear side thereof, a rib at a front side thereof, and a front center hole axially disposed at a center of said rib; an O-ring mounted in the annular groove on said movable valve so as to move with said movable valve into engagement with said tapered inside wall portion of said mounting base to close said fluid outlet; a stop block coupled to said movable valve, said stop block having a mounting rod fastened in the front center hole on said rib of said movable valve; and a spring member mounted around said rib of said movable valve and extending between said mounting base and said stop block, said spring member imparting a biasing force to said stop block, causing said movable valve to be moved with said stop block to force said O-ring into engagement with said tapered inside wall portion of said mounting base in closing said fluid outlet.

2. The automatic fluid stopper of claim 1, wherein said stop block and the rib of said movable valve, each have, respectively a cruciform cross-sectional configuration.

3. The automatic fluid stopper of claim 1, wherein said movable valve comprises an annular flange disposed in said front center hole on said rib; and the mounting rod of said stop block has an annular groove around the periphery forced into engagement with the annular flange inside the front center hole on said rib of said movable valve.

4. An automatic fluid stopper comprising: a mounting base having an outer thread around a periphery for threading into an inner thread in a fluid outlet pipe, the mounting base having a fluid outlet at a center, a tapered inside wall portion at a rear side of said fluid outlet, and two opposite tool notches bilaterally disposed adjacent to a front side of said fluid outlet; a movable valve inserted through the fluid outlet of said mounting base so as to be forced by fluid pressure in said fluid outlet pipe against said mounting base to close said fluid outlet, said movable valve having an annular groove around a periphery adjacent to a rear side thereof, a rib at a front side thereof, and a plurality of stop rods integral with said rib and for stopping at the front side of the fluid outlet on said mounting base; and an O-ring mounted in the annular groove on said movable valve so as to move with said movable valve into engagement with said tapered inside wall portion of said mounting base to close said fluid outlet.

5. The automatic fluid stopper of claim 4, wherein the rib of said movable valve has a cruciform cross-sectional configuration.

6. The automatic fluid stopper of claim 1 further comprising a fluid stopper mounting spanner having two plug tips extending from a front side thereof and located so as to engage the two opposite tool notches in said mounting base such that rotation of the fluid stopper mounting spanner rotates said mounting base to thread the mounting base into said fluid outlet pipe.

7. The automatic fluid stopper of claim 4 further comprising a fluid stopper mounting spanner having two plug tips extending from a front side thereof and located so as to engage the two opposite tool notches in said mounting base such that rotation of the fluid stopper mounting spanner rotates said mounting base to thread the mounting base into said fluid outlet pipe.

* * * * *